United States Patent [19]

Brines et al.

[11] 4,315,979

[45] Feb. 16, 1982

[54] RARE EARTH OXYHALIDE PHOSPHOR AND X-RAY IMAGE CONVERTERS UTILIZING SAME

[75] Inventors: Marjorie J. Brines, South Euclid; Jacob G. Rabatin, Chardon, both of Ohio

[73] Assignee: General Electric Company, Schenectady, N.Y.

[21] Appl. No.: 218,199

[22] Filed: Dec. 19, 1980

[51] Int. Cl.³ .......................... G01J 1/58; C09K 11/46
[52] U.S. Cl. .......................... 430/6; 250/483; 250/486; 252/301.4 H
[58] Field of Search .............. 252/301.4 H; 250/483, 250/486; 430/5, 6

[56] References Cited

U.S. PATENT DOCUMENTS

| | | | |
|---|---|---|---|
| 3,591,516 | 7/1971 | Rabatin | 252/301.4 H |
| 3,617,743 | 11/1971 | Rabatin | 250/71 |
| 3,795,814 | 3/1974 | Rabatin | 250/460 |
| 4,029,851 | 6/1977 | Degenhardt | 252/301.4 H |
| 4,070,583 | 1/1978 | Rabatin | 252/301.4 H |
| 4,080,306 | 3/1978 | Feretti | 252/301.4 H |

OTHER PUBLICATIONS

Matsubara, "Preparation of Infrared Stimulable Rare Earth Oxychloride Phosphors," *Mat. Res. Bull.*, vol. 7 (1972) pp. 963-970.

*Primary Examiner*—Brian E. Hearn
*Attorney, Agent, or Firm*—John F. McDevitt; Lawrence R. Kempton; Philip L. Schlamp

[57] ABSTRACT

Rare earth oxyhalide phosphors activated with terbium and/or thulium ion are described exhibiting improved brightness which are particularly useful in x-ray image converter devices by reason of producing less light scattering and absorption as a result of superior crystalline characteristics. A multilayer x-ray screen construction utilizing said phosphor material is also described utilizing said phosphor material which exhibits improved image sharpness and a reduced crossover problem. An improved process for producing said phosphor material is further disclosed wherein the selected oxyhalide is recrystallized in a molten alkali metal halide flux to produce the superior crystalline characteristics.

16 Claims, 3 Drawing Figures

RARE EARTH OXYHALIDE PHOSPHOR AND X-RAY IMAGE CONVERTERS UTILIZING SAME

CROSS REFERENCE TO RELATED APPLICATION

The crossover and image resolution problem associated with multilayer x-ray screen constructions utilizing rare earth oxyhalide phosphors activated with thulium ion are ameliorated to some degree by means disclosed in a co-pending patent application Ser. No. 180,845, entitled "X-Ray Image Converters Utilizing Rare Earth Admixtures," filed Aug. 25, 1980, which is assigned to the assignee of the present invention. In said co-pending patent application, there is disclosed a particular phosphor admixture utilizing thulium-activated oxyhalides of lanthanum and/or gadolinium to provide improved performance in this regard when used in multilayer radiographic screens in combination with the blue-sensitive or green-sensitive photographic film. The disclosed phosphor combination produces this improvement by altering the physical orientation of a plate-like oxyhalide phosphor particles in the phosphor layers of the improved radiographic screen so that less light is scattered in the photographic film direction and a shorter path length for light is provided to said photographic film.

BACKGROUND OF THE INVENTION

The present invention pertains to the preparation of particular rare earth oxyhalide phosphor materials activated with terbium and/or thulium which exhibits substantial brightness improvement when excited by x-radiation as well as providing less light scattering and absorption when utilized in x-ray image converter devices.

Conventional rare earth oxyhalide phosphors still experience considerable light scattering and absorption by reason of the crystalline characteristics of these plate-like phosphor particles. While a recrystallization process has been known for some time, as described in U.S. Pat. No. 3,591,516, wherein well-formed crystals of these oxyhalide materials can be grown in particular molten alkali metal halide fluxes, there still remains a need to improve the quality of the phosphor crystals for better performance in x-ray image converter devices. The conventional phosphor material still experiences considerable brightness loss attributable to phosphor particle size which is either too fine or too coarse and further brightness loss occurs in radiographic screens when the thickness of the conventional phosphor layers exceeds thicknesses customarily employed. The brightness loss experienced in the latter regard is especially significant with the conventional phosphors and which can be as much as 20 percent or greater in brightness loss if the phosphor loading exceeds 180 milligrams per square centimeter of surface area in the phosphor layer. The light scattering and self-absorption reduce brightness in the conventional phosphor material since the light cannot escape efficiently from the phosphor layer.

A second undesirable effect experienced with the conventional phosphor materials is that of light scattering in directions other than the direction of photographic film and which is due to the plate-like morphology of these phosphor crystals. More particularly, a conventional phosphor has a length and thickness ratio often exceeding 15:1 causing alignment parallel to the major film axis when deposited to form the phosphor layer in a radiographic screen. This alignment contributes to substantial light scattering parallel to said film with both loss in sharpness of the radiographic emission and a longer effective light path to reach the film which enhances the familiar crossover problem encountered with multi-layer radiographic screens. All of the foregoing light scattering problems with the conventional phosphor materials in x-ray image converter devices would be substantially reduced by preparing these phosphor materials in a manner which decreases the length and thickness ratio of the individual phosphor particles.

Accordingly, it is an important object of the present invention to provide a rare earth oxyhalide phosphor material exhibiting improved brightness as well as less light scattering and absorption from a modification of the phosphor crystalline characteristics.

It is another important object of the invention to provide an improved method of preparing rare earth oxyhalide phosphors exhibiting improved performance in x-ray image converter devices.

Still another important object of the present invention is to provide an improved multilayer x-ray screen construction utilizing the present phosphor materials to provide improvement in image sharpness and a reduced crossover problem.

SUMMARY OF THE INVENTION

An improved brightness rare earth oxyhalide phosphor material is provided having the following structural formula:

$LnOX:T_x$ 

wherein Ln is one or more of La and Gd,
X is one or more of Cl and Br, and
$T_x$ is an activator ion selected from Tb and Tm, including mixtures thereof;
and characterized by recrystallized phosphor crystals in the average median particle size range not below about 2 microns and not greater than about 16 microns as measured on the Coulter Counter instrument and being shaped as plate-like particles having a length to thickness ratio no greater than about 10 to 1, said phosphor exhibiting less light scattering and absorption by reason of said crystalline characteristics. Preparation of said improved phosphor material can be obtained by heating a mixture of the rare earth oxides of the selected oxyhalide and rare earth ion with ammonium halide whose halide is that of the selected oxyhalide for a time and temperature to form the selected oxyhalide phosphor material and thereafter reheating the phosphor material with an alkali halide mixture whose halide is again that of the selected oxyhalide for a time of at least one hour and at a temperature above the eutectic melting temperature of the selected alkaline halide mixture to recrystallize the phosphor material. An alternate method of phosphor preparation mixes alkali metal carbonates of the selected oxyhalide with the starting materials before the initial heating step so that said alkali metal carbonates react with said ammonium halide to form the selected alkali halide mixture in the initial step. The mixture heated to recrystallize said selected oxyhalide phosphor materials can further comprise:

$$uAX + wMX_2 + yRX_3 + zROX$$ 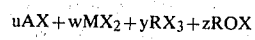

wherein
X is the selected halide,

A is one or more of Li, Na, K and Cs,

M is one or more of Mg, Ca, Sr, Ba, Zn, Mn and Cd,

R is one or more of La and Gd, u is from a small but effective amount up to about 50 weight percent, w is from 0 up to about 20 weight percent, y is from a small but effective amount up to about 50 weight percent, and z is at least 40 weight percent.

The improved shape and size of the individual phosphor particles prepared in the foregoing manner enables otherwise conventional x-ray screens to be constructed exhibiting at least 15% and up to about 30% brightness increase with improved image quality at increased speeds in a corresponding amount.

Preferred rare earth oxyhalide phosphor materials of the present invention comprise lanthanum and gadolinium oxybromide activated with terbium and/or thulium ion, including mixtures thereof. Said terbium-activated phosphor utilizes terbium ion at a concentration in the range from about 0.0001 to about 0.10 mole per mole of the selected oxybromide material. Correspondingly, the thulium-activated phosphor material utilizes thulium ion in a range from about 0.0001 to about 0.10 mole per mole of the selected oxybromide material.

In the preferred x-ray screen constructions of the present invention, the foregoing phosphor materials are employed in a pair of phosphor layers which are positioned on each side of a double emulsion photographic film to form a multilayer sandwich configuration. The preferred embodiment of said multilayer x-ray screen further includes utilization of a UV absorption dye in the otherwise transparent support layer of the photographic film member to cooperate with the present phosphor materials and reduce the amount of emitted radiation which can cross over to the more remote emulsion layer. Crossover causes widening of images and blurring due to lack of alignment or registry between the image as formed on the next adjacent emulsion layer when exposed and the crossover image formed on said more remotely exposed emulsion layer.

DESCRIPTION OF THE PREFERRED EMBODIMENTS

Figure 1:
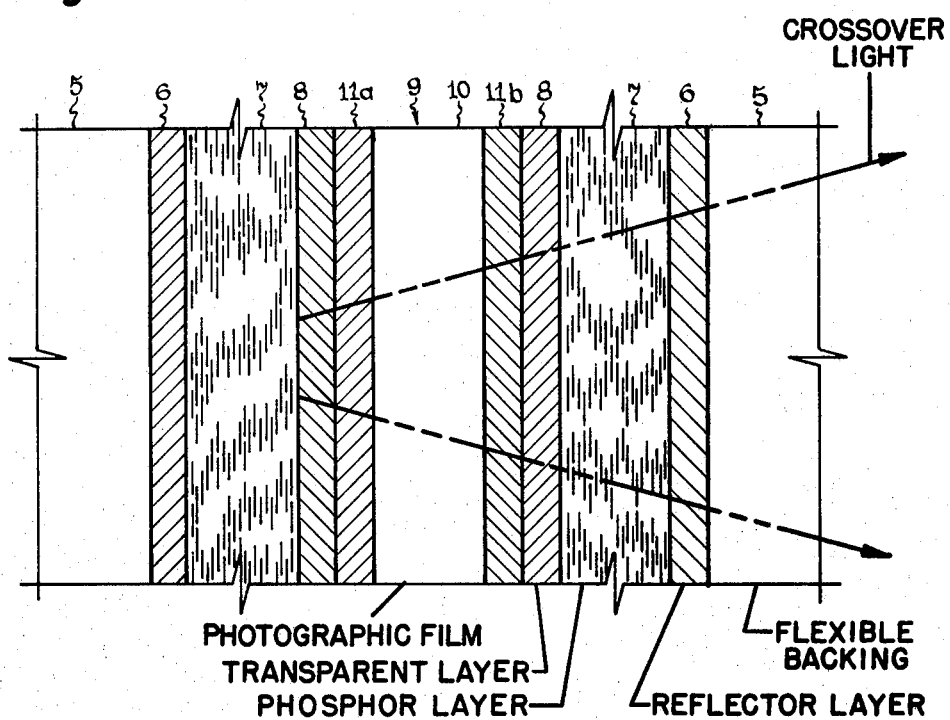
FIG. 1 is a cross section of an improved multi-layer x-ray screen construction which incorporates the present phosphor materials along with a dye system to absorb ultraviolet light which ordinarily crosses over from the silver halide emulsion layer being exposed to the other emulsion layer.

Referring to FIG. 1, a multilayer x-ray screen construction is depicted in cross section having a double emulsion photographic film 9 which has an optically transparent polyester base 10 incorporating a dye system to absorb the ultraviolet and light emission which ordinarily crosses over from one of the silver halide emulsion layers to the other, 11a to 11b, vice-versa. As previously indicated, such emission crossover will cause the widening of images and blurring due to the lack of alignment or registry between the images formed on the particular emulsion layer being exposed and the more remote emulsion layer receiving the crossover image. This is illustrated by the crossover rays passing from emulsion layer 11a to 11b in the depicted embodiment. As will be appreciated, there is an enlarged image on the emulsion layer 11b which will be read as a blurring effect after the film has been developed. Said crossover problem is ameliorated in accordance with the present invention by utilizing a more uniform size and shape of individual phosphor particles in the phosphor layers of said x-ray screen thereby reducing the light scattering and self-absorption causes of this problem. As further shown in said accompanying drawing, the preferred x-ray screen member further includes flexible backing 5 which supports a pair of reflecting layers 6 positioned adjacent the exteriormost major surfaces of the pair of phosphor layers 7. Further transparent layers 8 are utilized in the preferred x-ray screen embodiment to resist mechanical abrasion of the photographic film and/or phosphor layers during physical movement therebetween when exposed film is removed for development and a new film inserted for additional use of the multilayer x-ray screen member.

Figure 2:
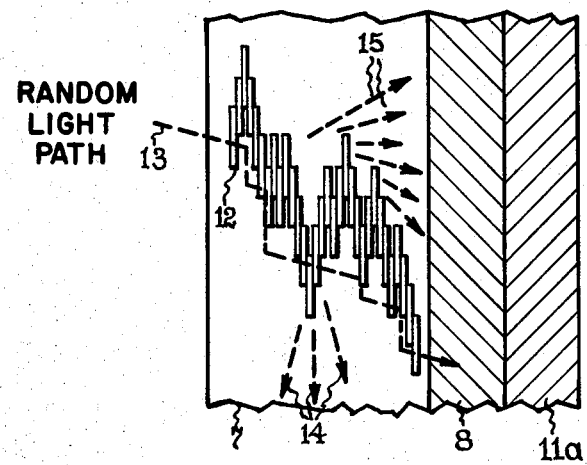
FIG. 2 is a more detailed cross-sectional view depicting a light path through an individual phosphor layer produced in accordance with the present invention.

In FIG. 2, there is shown a more detailed illustration of the individual phosphor layers 7 produced in accordance with the present invention along with an associated photographic emulsion layer 11a and the transparent layer 8, all as depicted in the FIG. 1 construction. Accordingly, the plate-like shaped rare earth oxyhalide phosphor particles 12 are generally stacked in a parallel direction with respect to the principal axis of the associated photographic film. Unlike the conventional phosphor materials, however, there is a narrow particle size distribution containing few fine size particles or coarse size particles which can both lead to light scattering with accompanying loss and sharpness of the radiographic image. As a result, the random light path 13 of said phosphor layer will be shorter than would be provided with the conventional phosphor material since the reduced light scattering and self-absorption permits the light to escape from the phosphor layer more efficiently. It can further be noted from the drawing in this regard that fewer light rays 14 escape in a direction generally parallel to the principal film axis than the light rays 15 which are desirably transmitted to the associated photographic film.

Figure 3:
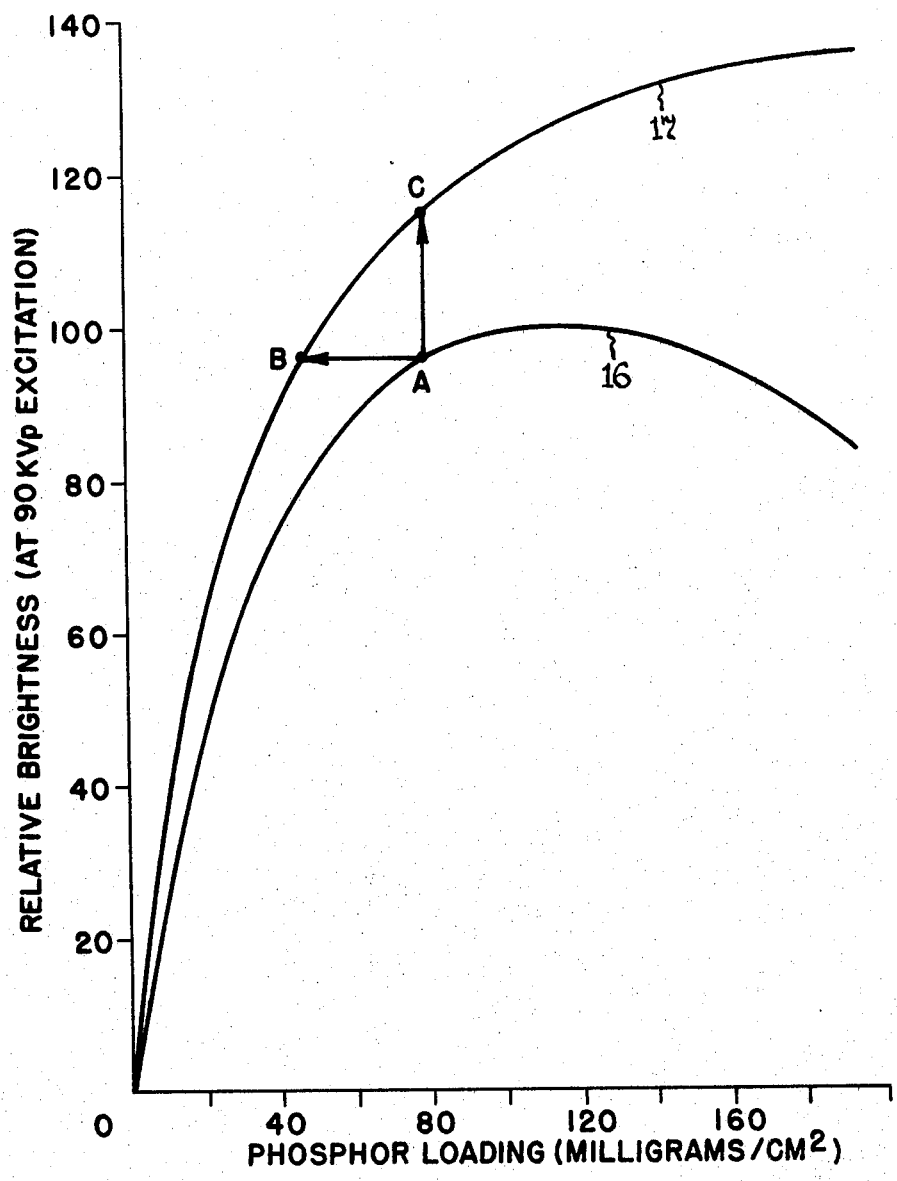
FIG. 3 is a graph depicting phosphor brightness when used in an x-ray screen layer with variation of the phosphor loading in said screen layer.

There is shown in FIG. 3 a graph representing relative brightness of the phosphor layer in an x-ray screen with variation of the phosphor loading in said phosphor layer as measured by phosphor weight per square centimeter of area. The particular phosphor layer evaluated in this manner utilized approximately equal parts by weight phosphor and organic polymer binder with the phosphor loading variation being achieved by different thicknesses of said phosphor layers. The curve 16 in said graph represents relative brightness measurements made with phosphor loading variation for lanthanum oxybromide phosphor activated with approximately 0.003 moles of thulium ion per mole of said phosphor material. Curve 17 represents lanthanum oxybromide phosphor again activated with approximately 0.003 moles thulium ion per mole phosphor as prepared in accordance with the present invention. Points A and C on said curves illustrate a typical phosphor loading employed in conventional x-ray screens of 80 milligrams phosphor per square centimeter of phosphor surface area and with the present improved phosphor demonstrating approximately 22 percent increased brightness. A comparison of points A and B on said curves further illustrates the same brightness being achieved at a reduced phosphor loading of approximately 46 milligrams phosphor per square centimeter of phosphor surface area. Both of said comparisons thereby demonstrate that the present phosphor is a more efficient material when employed in x-ray image converter devices. Of equal importance in this regard, there was found to be a brightness loss with increased phosphor loading in said conventional phosphor material to the extent shown in curve 16. Accordingly, as phosphor loading increases in thickness with the conventional phosphor material beyond a certain thickness, enough scattering and absorption occurs therein to prevent light escape.

The improved process of the present invention will be described below for preparation of lanthanum oxybromide activated with various levels of thulium ion although an analagous process can be used for preparation of the other phosphors above specified. Accordingly, to obtain a final improved phosphor of lanthanum oxybromide activated with approximately 0.003 thulium ion, there is initially blended 315 grams lanthanum oxide, 1.00 grams thulium oxide, 278 grams ammonium bromide, 12 grams lithium carbonate, and 8 grams potassium carbonate. Said mixture is fired in a suitable covered tray at approximately 400° C. for about 2 hours to form the selected oxyhalide phosphor. A weight loss of about 12% occurs in the initial firing step and with said reaction mixture now containing approximately in weight percent 5% lithium bromide, 3% potassium bromide, 12% mixed lanthanum and thulium bromide, and 80% of the lanthanum oxybromide phosphor activated with approximately 0.003 moles of thulium ion per mole of phosphor. After thoroughly blending said reaction mixture, the blended mixture was again fired in covered trays at approximately 800° C. during which the desired phosphor recrystallization took place in the molten flux. After washing, drying and sifting, the phosphor material was employed as a phosphor layer in an x-ray screen for comparison with the same composition phosphor material prepared in accordance with the aforementioned U.S. Pat. No. 3,591,516. The variation found in the phosphor brightness and phosphor particle size resulting from said comparison is reported in Table I below:

TABLE I

| Sample # | Recrystallization Flux | Firing Temp. | X-Ray Brightness (Relative) | Coulter APD (Microns) |
|---|---|---|---|---|
| 1 | U.S. Pat. No. 3,591,516 | 900° C. | 100% | 10.0 |
| 2 | LiBr—KBr—LaBr$_3$ | 800 | 128 | 8.2 |
| 3 | LiBr—KBr—LaBr$_3$ | 815 | 128 | 9.5 |
| 4 | LiBr—KBr—LaBr$_3$ | 875 | 124 | 12.3 |

Said comparison demonstrates that the present method improves phosphor brightness by over 20 percent and reduces the required firing temperature by approximately 80° C. to obtain the same phosphor particle size compared to the conventional phosphor preparation. A more narrow particle size distribution is also obtained in accordance with the present method so that at 5 microns average particle size, there is less than 2% material with a particle size less than 2 microns diameter as compared with about 10 percent of said fines with conventional preparation. Likewise, fewer coarse particles are present in the final phosphor prepared according to the present method which leads to improved resolution of the radiographic image due to less spreading of light in the phosphor layer.

An alternate method of phosphor preparation according to the present invention, preforms an alkali halide flux mixture whose halide is that of the selected oxyhalide and which can have an alkali metal ratio preferably of the eutectic composition which for lithium and potassium ion melts at approximately 348° C. To prepare the same lanthanum oxybromide phosphor activated with 0.003 molar concentration thulium ion as above disclosed with said preformed alkali halide flux mixture, there is thoroughly mixed the following starting materials:

250 grams mixed lanthanum oxide containing approximately 0.003 thulium oxide with 175 grams of ammonium bromide.

This starting mixture is fired again in covered trays at about 400° C. for 2 hours. The cool reaction mixture containing the selected oxyhalide phosphor is next blended with the finely divided preformed flux above disclosed and again fired in covered trays at 800° C. for 2 hours. The fired cake is washed to remove soluble salts, dried and sifted for use in x-ray screens. An unexpected benefit achieved with the above modified method was reduction in thulium-activator level from 0.003 moles to 0.002 moles per mole of phosphor or less with no loss in x-ray brightness. An evaluation of said x-ray brightness at various thulium activator levels is reported in Table II below using an x-ray brightness standard of 100% for the same conventional phosphor material previously reported in Table I.

TABLE II

| Sample # | Thulium Level (Mole/Mole Phsophor) | Firing Temp. | X-Ray Brightness (Relative) | Coulter APD (Microns) |
|---|---|---|---|---|
| 5 | .001 | 800° C. | 116% | 13.1 |
| 6 | .003 | 800 | 128 | 8.2 |
| 7 | .002 | 815 | 131 | 10.9 |
| 8 | .003 | 815 | 128 | 9.5 |
| 9 | .004 | 815 | 122 | 8.0 |

From the above results, it seems apparent that relatively small changes in the thulium activator level produces large effects on particle size in the final recrystallized phosphor product.

A still more narrow particle size distribution can be obtained in accordance with the preparation method of the present invention by adding certain divalent metal halides whose halide is that of a selected oxyhalide to the alkali metal halide mixture. Accordingly, typical recrystallization flux mixtures are reported in Table III below together with the effect upon x-ray brightness and average phosphor particle size.

TABLE III

| Sample # | Recrystallization Flux | Firing Temp °C. | X-Ray Brightness (Relative) | Coulter APD (Microns) |
|---|---|---|---|---|
| 10 | LiBr—KBr—MgBr$_2$—LaBr$_3$ | 810° C. | 79% | 9.0 |
| 11 | LiBr—KBr—MnBr$_2$—LaBr$_3$ | 810 | 95 | 8.5 |
| 12 | LiBr—KBr—SrBr$_2$—LaBr$_3$ | 850 | 95 | 9.1 |
| 13 | LiBr—KBr—BaBr$_2$—LaBr$_3$ | 810 | 114 | 6.8 |
| 14 | LiBr—KBr—CdBr$_2$—LaBr$_3$ | 810 | 119 | 7.4 |
| 15 | LiBr—KBr—LaBr$_3$ | 815 | 128 | 8.2 |
| 16 | LaBr$_3$ only | 850 | 93 | 7.5 |

The above results demonstrate that presence of divalent metal halides in the recrystallization flux mixture generally reduces the x-ray brightness as compared with the flux mixture shown in Example 15. On the other hand, a narrow particle size distribution is obtained with divalent metal halide containing flux mixtures which is desirable to achieve the desired performance improvement in x-ray image converter devices. Further presence of a rare earth halide selected from lanthanum halide and gadolinium halide whose halide is that of the selected oxyhalide phosphor is also desirable in the present alkali metal halide flux mixtures to help prevent oxygen contamination from the ambient atmosphere during phosphor firing. More particularly, said rare earth halide flux ingredient reacts with oxygen to produce halogen gas which displaces air in the firing trays preventing further oxidation of the phosphor material.

It will be apparent from the foregoing description that both novel phosphor materials and x-ray image converter devices utilizing said phosphor materials have been disclosed exhibiting particular advantages in performance. It should be appreciated from said foregoing description that improved phosphors of the present invention can be prepared having a modified composition other than specifically disclosed but still utilizing the present teachings. For example, a minor or major substitution of chloride ion for bromide ion in the rare earth oxyhalide phosphor compositions would still achieve the same advantages above disclosed. It is intended to limit the present invention, therefore, only by the scope of the following claims.

What we claim as new and desire to secure by Letters Patent of the United States is:

1. An improved brightness oxyhalide phosphor having the following structured formula:
LnOX:$T_x$
wherein
Ln is one or more of La and Gd,
X is one or more of Cl and Br, and
$T_x$ is an activator ion selected from Tb and Tm, including mixtures thereof;
consisting essentially of recrystallized phosphor crystals in the average median particle size range not below about 2 microns and not greater than about 16 microns and being shaped as plate-like particles having a length to thickness ratio no greater than about 10 to 1, said phosphor exhibiting less light scattering and absorption by reason of said crystalline characteristics.

2. An improved brightness phosphor as in claim 1 wherein $T_x$ is Tb at a concentration in the range from about 0.0001 to about 0.10 mole per mole of the selected oxyhalide.

3. An improved brightness phosphor as in claim 1 wherein $T_x$ is Tm at a concentration in the range from about 0.0001 to about 0.10 mole per mole of the selected oxyhalide.

4. An improved brightness phosphor as in claim 1 wherein the selected oxyhalide is lanthanum oxybromide.

5. An x-ray image converter including the phosphor of claim 1 supported on a base member, said phosphor converting x-radiation to radiation of a longer wavelength with improved image sharpness.

6. An improved multilayer x-ray screen construction which comprises:

(a) a photographic film having emulsion layers disposed on each major surface and separated by an optically transparent support,
(b) a pair of phosphor layers being positioned on each side of said photographic film to form a sandwich configuration, and
(c) each of said phosphor layers comprising an improved brightness oxyhalide phosphor having the following structural formula:
LnOX:$T_x$
wherein
Ln is one or more of La and Gd,
X is one or more of Cl and Br, and
$T_x$ is an activator ion selected from Tb and Tm, including mixtures thereof;
consisting essentially of recrystallized phosphor crystals in the average median particle size range not below about 2 microns and not greater than about 16 microns and being shaped as plate-like particles having a length to thickness ratio no greater than about 10 to 1, said phosphor exhibiting improved image sharpness and reduced crossover problem.

7. An improved x-ray screen as in claim 6 wherein $T_x$ is Tb at a concentration in the range from about 0.001 to about 0.005 mole per mole of the selected oxyhalide.

8. An improved x-ray screen as in claim 6 wherein $T_x$ is Tm at a concentration in the range from about 0.001 to about 0.004 mole per mole of the selected oxyhalide.

9. An improved x-ray screen as in claim 6 wherein the selected oxyhalide is lanthanum oxybromide.

10. A process for the production of lanthanum and gadolinium oxyhalide phosphor crystals selected from the group consisting of oxychlorides and oxybromides activated with a rare earth ion selected from terbium and thulium, including mixtures thereof, consisting essentially of recrystallized phosphor crystals with average median particle size range not below about 2 microns and not greater than about 16 microns and being shaped as plate-like particles having a length to thickness ratio no greater than about 10 to 1, comprising the following steps:
(a) heating mixtures of particles of the oxides of the selected oxyhalide and rare earth ions with ammonium halide whose halide is that of the selected oxyhalide for a time and a temperature sufficient to form the selected oxyhalide phosphor and
(b) heating a mixture of said selected oxyhalide phosphor with an alkali halide mixture whose halide is that of the selected oxyhalide for a time of at least about one hour at a temperature above the eutectic melting temperature of the selected alkali halide mixture to recrystallize said selected oxyhalide phosphor.

11. A process as in claim 10 in which the alkali metal carbonates of the selected alkali halide mixture are added to the starting materials before the initial heating step so that said alkali metal carbonates will react with said ammonium halide to form the selected alkali halide mixture in the initial step.

12. A process as in claim 10 in which divalent metal halides whose halide is that of the selected oxyhalide is added to the alkali halide mixture.

13. A process as in claim 10 in which a rare earth halide selected from lanthanum halide and gadolinium halide whose halide is that of the selected oxyhalide is added to the alkali halide mixture.

14. A process as in claim 10 in which divalent metal halides whose halide is that of the selected oxyhalide is added to the alkali halide mixture with a rare earth halide selected from lanthanum halide and gadolinium halide whose halide is also that of the selected oxyhalide.

15. A process as in claim 10 in which the mixture heated to recrystallize said selected oxyhalide phosphor comprises:

$$uAX + wMX_2 + yRX_3 + zROX$$

wherein
X is the selected halide,
A is one or more of Li, Na, K and Cs,
M is one or more of Mg, Ca, Sr, Ba, Zn, Mn and Cd,
R is one or more of La and Gd,
u is from a small but effective amount up to about 50 weight percent,
w is from 0 up to about 20 weight percent,
y is from a small but effective amount up to about 50 weight percent, and
z is at least 40 weight percent.

16. A process as in claim 10 in which an alkali metal halide whose halide is that of the selected oxyhalide and selected from halides of Li, Na, K, and Cs is added to the starting materials before the initial heating step with a divalent metal halide whose halide is that of the selected oxyhalide and selected from halides of Mg, Ca, Sr, Ba, Zn, Mn and Cd.

* * * * *